United States Patent [19]
Kouchi et al.

[11] 4,086,003
[45] Apr. 25, 1978

[54] ELECTROCHROMIC DISPLAY CELL

[75] Inventors: Akihiko Kouchi; Tsutomu Otake; Hiroshi Takeshita, all of Suwa; Kunihiro Inoue, Okaya, all of Japan

[73] Assignee: Kabushiki Kaisha Suwa Seikosha, Tokyo, Japan

[21] Appl. No.: 596,135

[22] Filed: Jul. 15, 1975

[30] Foreign Application Priority Data
  Jul. 15, 1974  Japan .................................. 49-80934
  Jul. 22, 1974  Japan .................................. 49-83933

[51] Int. Cl.² .......................... G02B 5/23; G02F 1/01; G02F 1/11; G02F 1/17
[52] U.S. Cl. .................... 350/357; 313/358; 313/483
[58] Field of Search ............... 313/358, 483, 489, 517, 313/518; 350/160 R

[56] References Cited
U.S. PATENT DOCUMENTS

| 2,918,594 | 12/1959 | Fridrich | 313/358 X |
| 3,283,656 | 11/1966 | Jones et al. | 350/160 R |
| 3,371,243 | 2/1968 | Bramley et al. | 313/358 X |
| 3,391,068 | 7/1968 | Rauhut | 313/358 |
| 3,443,859 | 5/1969 | Rogers | 350/160 R |
| 3,500,392 | 3/1970 | Maljuk et al. | 313/317 |
| 3,521,941 | 7/1970 | Deb et al. | 350/160 LC |
| 3,864,905 | 2/1975 | Richardson | 350/160 LC |
| 3,868,534 | 2/1975 | Pighin et al. | 313/358 |
| 3,883,768 | 5/1975 | Voinov et al. | 313/358 |
| 3,900,418 | 8/1975 | Bard et al. | 313/358 |
| 3,906,283 | 9/1975 | Bard et al. | 313/358 |
| 3,922,067 | 11/1975 | Murao et al. | 350/160 LC |
| 3,924,932 | 12/1975 | Yamamoto | 350/160 LC |
| 3,932,024 | 1/1976 | Yaguchi et al. | 350/160 LC |
| 3,939,556 | 2/1976 | Borel et al. | 350/160 LC |
| 3,947,091 | 3/1976 | Trcka | 350/160 LC |
| 3,952,193 | 4/1976 | Haas et al. | 350/160 LC |

Primary Examiner—Saxfield Chatmon, Jr.
Attorney, Agent, or Firm—Blum, Moscovitz, Friedman & Kaplan

[57] ABSTRACT

An electrochromic display cell has a first transparent plate for viewing said display therethrough and a second plate having thereon a reflective metal coating, said coating being inert to electrochemical oxidation under the conditions of operation of said display. Conductive leads are covered, at least in part, by an insulating film.

4 Claims, 12 Drawing Figures (a)

(b)

(c)

(d)

(e)

(f)

ELECTROCHROMIC DISPLAY CELL

BACKGROUND OF THE INVENTION

In recent years, the development of various types of electrical instruments such as wristwatches, calculators, computers, etc., which operate electronically, has generated a need for digital display devices. Where the instruments are to be portable, and therefore separated from powered mains, it is highly desirable that the digital display device should consume as little power as possible. As digital devices, display cells using liquid crystals, light-emitting diodes and the electrochromic effect have been devised. So far as the liquid crystals are concerned, the display cannot be seen clearly where the light level is low, so that the color tones developed are indistinct and the contrast is low. As for light-emitting diodes, the consumption of power is substantial so that, so far as a wristwatch is concerned, it becomes necessary to provide for push-button actuation, a serious inconvenience requiring the use of both hands. As for the electrochromic devices, an extremely clear display can be obtained at a low power level, but displays of this type have not come into wide use because of the following defects:

1. The useful life of the electrode is short.
2. It is difficult to erase the display, once the need for same is terminated.
3. The response speed is inadequate for many uses.
4. Display arrangements used thus far have been rendered confusing due to the fact that the conductive leads become visible.
5. The operating voltage required to activate the display is substantially above that which causes electrolysis of water which must be present. This leads to degradation of the system and a short operating life.

As is evident, electrochromic display cells would have much wider application than at present if the above difficulties could be eliminated.

SUMMARY OF THE INVENTION

In an electrochromic display cell the confusion in the display occasioned by visibility of the leads is eliminated by covering the leads with an insulating material, so that oxidation of the electrochromic material cannot occur at said leads. Preferably, at least that portion of the leads within the display area should be covered. $CaF_2$, $MgF_2$ and silicone resins are suitable.

The operating voltage of an electrochromic display cell is greatly reduced by coating the display area on the inner surface of the rear wall of the cell with a reflective material, preferably silver or gold. In addition, both the response time and the erase time are greatly reduced. Further, the need for a third electrode to be used during the erase operation is eliminated.

The front plate or wall of the display cell is, of course, transparent and so, usually, are the leads used for connecting the electrode or electrodes on the front wall with the external source of voltage. The electrode lead can be masked by covering it with a reflective and inert metal. A convenient combination consists of a layer of chromium immediately over the lead plus a layer of silver over the chromium.

Accordingly, an object of the present invention is an electrochromic display cell of higher visibility and contrast.

Another object of the present invention is an electrochromic display cell having shorter writing and erase times.

A further object of the present invention is an electrochromic display cell which operates at a lower voltage than is hitherto the case.

An important object of the present invention is an electrochromic display cell which is free of the requirement of a third electrode for erasure.

A significant object of the present invention is an electrochromic display cell in which the leads from the electrodes do not give rise to visible color.

Still a further object of the present invention is an electrochromic display cell with an operational life of at least $10^6$ switchings.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
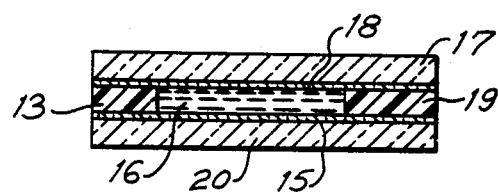
FIG. 1 is an electrochromic display cells in accordance with the prior art.

An electrochromic display cell of conventional design is shown in FIG. 1 in which a cell consists essentially of front and rear walls 17 and 20 having conductive electrodes 18 and 15 respectively on the interior surfaces thereof. Spacers 19 seal the edges of the cell which contains electrolyte 16. Electrolyte 16 consists of an electrochromic compound and an auxiliary material which serves for imparting conductivity. The solvent may be water or alcohol, and the current-carrying electrolyte may be KBr or $H_2SO_4$.

On the application of a voltage between the transparent electrodes on the opposed inner surfaces of the walls, an oxidation-reduction occurs at the interfaces of the electrodes and the electrolyte. The electrode or electrodes on the inner surface of front wall 17 must, of course, be transparent and, conveniently are in the known seven-segment shape.

A suitable electrochromic compound is N,N'-di(n-heptyl)-4,4'-bipyridinium dibromide. An appropriate concentration for this compound is 0.1 molar with 0.3 molar KBr, water being the solvent.

As is known, write-in occurs by means of the imposition of voltage. However, when an attempt is made to erase, color is generated at the opposite electrode. This is what makes it necessary to provide a third electrode for erasure in conventional devices. A further difficulty with this type of arrangement, when NESA glass is used as the basis for the transparent electrodes is that it takes as much as 30 or 40 minutes for write-in or erasure so that the display speed is very low, making it impossible to put the above-mentioned display device to practical use as a digital display. Moreover, if the applied voltage is augmented for increasing the display and erasure speeds, the electrode is damaged after several reversals of voltage and bubbles are generated. As is evident, the system cannot be used unless the electrode can be operated below about 1.0 volts and unless the response speed can be lowered to a few hundred milliseconds.

Figure 2:
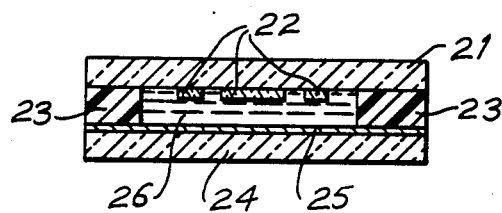
FIG. 2 is an electrochromic display cell in accordance with the present invention and having a reflective film on the interior surface of the further wall.

An embodiment of the present invention is shown in section in FIG. 2, a seven-segment electrode pattern being provided on upper glass plate 21 by the etching of a NESA transparent deposit and a metal electrode 25 being provided on plate 24. The electrode pattern as shown in plan in FIG. 3 in which the lead portions of the electrodes, as indicated by the oblique lines, are coated with a silicone resin so that the lead portions of the electrodes do not make contact with the electrochromic solution. In this embodiment, the lead portions 31 are coated but contact portions 32 are not coated. The electrode segments are indicated in FIG. 2 by the reference numeral 22 on upper glass plate 21. Spacers 23 are provided for sealing the edges of the cell. Lower glass plate 24 is preferably coated over the entire surface thereof, but must be coated at least in the regions immediately opposite electrodes 22. Coating 25 must be reflective, and, also, must be inert to oxidation when made positive. Suitable materials for coating 25 are silver and gold with silver being preferred both because it is lower in cost and because its reflectivity is higher.

The electrochromic solution 26 may be the same as that described in connection with FIG. 1.

Application of a voltage of about 1.2 volts between selected segments 22 and common electrode 25 with electrode 25 being positive makes it possible to display any digit with the color appearing at the activated segments 22. The color remains after the voltage is removed. However, when the voltage is reversed, the color is extinguished. As described, color is developed by application of the voltage in one direction and erased by application of the voltage in the opposite direction. Accordingly, no third electrode is required for erasure. Moreover, the write-in time is at most about 200 milliseconds which is substantially less than that required for the conventional cell using NESA electrodes on both plates, and the extinction time is also very short, namely being 100 milliseconds or less. In a conventional cell, in order to reduce the write-in time to 1 second or less, it is necessary to use at least 3 V as a result of which electrolysis of water takes place, as aforenoted. The hydrogen and oxygen generated by the electrolysis of water damage the electrodes and, eventually, can result in an explosion. In any event, the life of the cell becomes extremely short.

The cell of the present invention can conveniently be operated at 1.2 V, and, indeed, can be operated at voltages as low as 1.0 V at which voltage the write-in time is no more than 350 milliseconds and the extinction time is no more than 200 milliseconds. By operation at 1.2 V, and, preferably, at 1.0 V and even less, as is practicable with cells in accordance with the present invention, electrolysis of water is completely prevented and the life of the cell becomes very long. In fact, cells have been switched in excess of $10^6$ times.

In another embodiment of the invention, the construction is similar to that described in the first embodiment except that the film deposited on the inner surface of the lower wall is of gold. When the cell is driven by a voltage of 1.1 V, the write-in time is 300 milliseconds and the time for extinction is 150 milliseconds. Virtually no color was developed on the gold electrode during erasure. The yellow color of the gold deposit is attractive as a background for the display and the gold, is, of course, extremely resistant to chemical attack.

In a third embodiment of the cell, the lower, common electrode may be of either silver or gold. The lead portions of the electrode segments however, are covered with chromium and then with silver.

Figure 4:
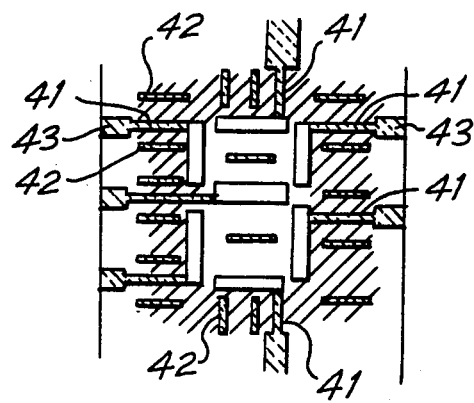
FIG. 4 is an electrochromic display cell in which the leads are covered with an insulating film and the film is coated with a reflective inert metal and the cell further incorporates a design of said reflective, inert metal.

In order to prepare the three layers of NESA, chromium and silver, the NESA was deposited first by conventional means. Next, chromium and silver were successively deposited on the entire surface of the glass substrate and then removed by etching leaving only electrode leads 41 (FIG. 4) covered with chromium and silver. It will be noted that in this embodiment contact areas 43 also are covered with silver and chromium.

A further development of this pattern involves the retention of chromium-silver strips 42 as part of a decorative pattern, the strips 42 serving to conceal the fact that strips 41 are functional elements. Covering the NESA leads with chromium and silver or with any other reflective conductive and inert metals reduces the write-in time to about 150 milliseconds and the extinction time to about 100 milliseconds.

It is believed that the reason for the reduction in response and extinction time resulting from the use of the silver electrodes is due to a change in the electrode potentials. However, it is to be recognized that the explanation for the phenomenon observed is not a part of the invention and does not affect the patentability thereof.

Figure 5:
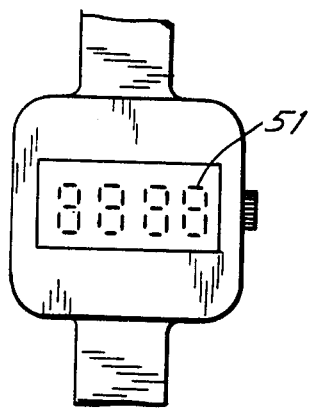
FIG. 5 is a watch incorporating a display cell in accordance with the present invention.
Figure 6:
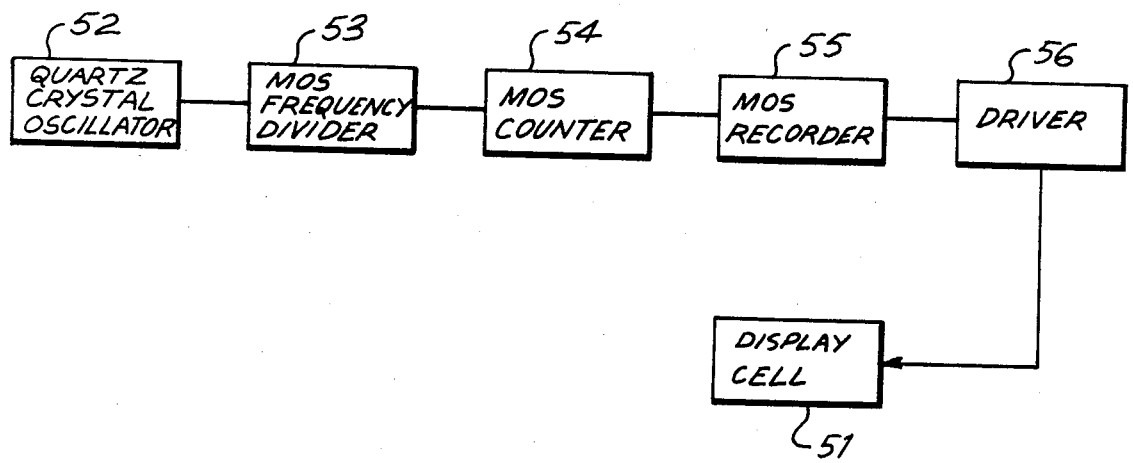
FIG. 6 is a box diagram of the circuitry in such a watch.

The appearance of a watch employing a digital display device based on an electrochromic material is shown in FIG. 5, one of the digital display numerals being indicated by the reference numeral 51. The circuitry necessary for operating a watch is shown diagrammatically in FIG. 6.

Figure 3:
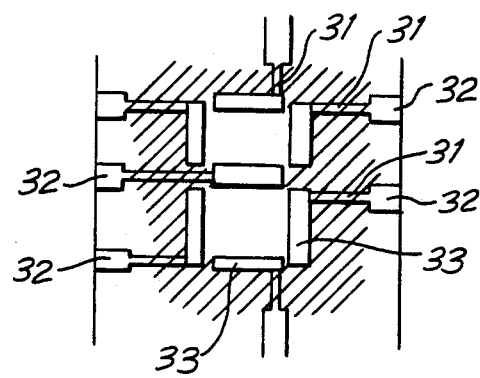
FIG. 3 is an electrochromic display cell wherein the leads are covered with an insulating film.
Figure 7:
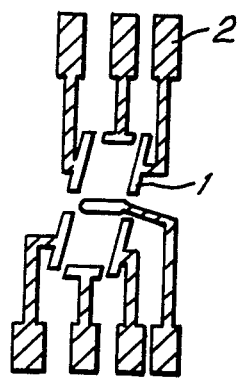
FIG. 7 shows the electrodes on the front plate of an electrochromic display cell wherein the leads and contact areas are covered with an insulating film.

As is evident, insulation of the lead portions of the electrode is advantageous, even in the absence of a common metal electrode on the opposing plate. An arrangement of segments and leads which is slightly different in appearance from that of FIG. 3 is shown in FIG. 7. Tin oxide or indium oxide electrodes 1 are not covered with insulator. However, the remainder of the leads and contact areas 2 are covered with insulator. Of course, small regions of contact areas 2 (not shown) are left uncovered so that contact may be made thereto. The segmental arrangement of FIG. 7 is shown in cross-section in FIG. 8, the segments being indicated by the reference numeral 3. The cell as before, is sealed with plastic spacers 3a. A NESA glass electrode is used as a common electrode on the lower glass plate. The appearance of such a segmental array is shown as a portion of a wristwatch in FIG. 9, segments being indicated by reference numeral 4.

In general, a NESA film is prepared by spraying of the appropriate solution on a glass substrate. A resist pattern is then formed on the deposit and the portion of the deposit not needed is removed by etching as by the use of zinc powder and 10% HCl.

A deposit of magnesium fluoride is conveniently used as the insulator on the oblique-lined portions of the electrode leads. $CaF_2$ and silicone resins are also suitable insulators.

Figure 10:
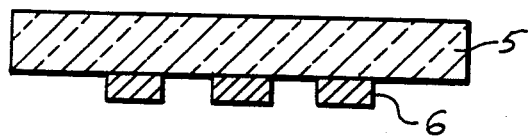
FIGS. 10a through 10f show successive stages of preparation of such insulating leads as shown in FIGS. 7 and 8.
Figure 10:
Figure 10:
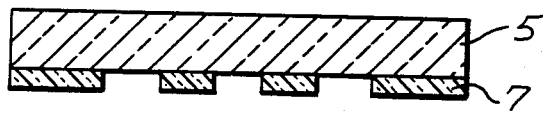
Figure 10:
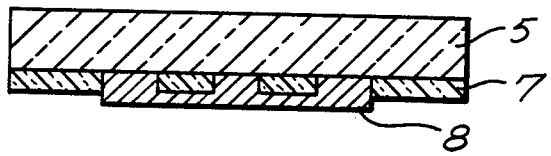
Figure 10:
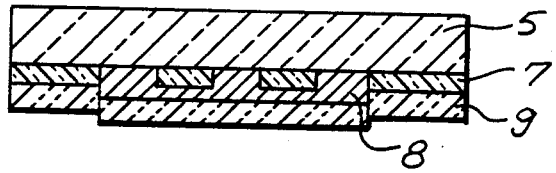
Figure 10:
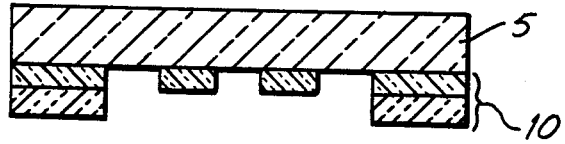

Another means of forming the needed pattern is shown in FIG. 10. Here the conductive electrodes are made of indium oxide. As shown in FIG. 10a a metallic mask 6 is formed on glass substrate 5. Indium oxide is then deposited on the glass substrate as shown in FIG. 10b, and the metallic mask is removed from the glass substrate as shown in FIG. 10c. FIG. 10d shows the substrate to which is applied a metallic mask corresponding to the electrode lead portions which are to be coated. Calcium fluoride is then deposited as shown in FIG. 10e, and the metallic mask is removed leaving the transparent electrode pattern in which the electrode leads are covered by insulators as shown in FIG. 10f.

Figure 11:
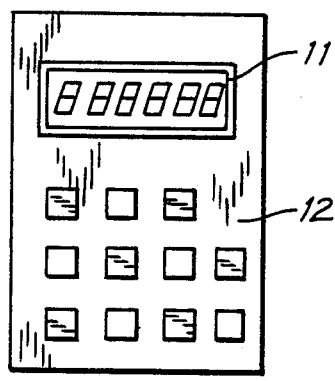
FIGS. 11 and 12 are respectively a calculator and a millivolt meter incorporating electrochromic display cells in accordance with the present invention.

The electrochromic solution can be as before. However, ranges are possible since the concentrations are not critical. A suitable concentration of the electrochromic element is 0.2 molar, keeping the potassium bromide at 0.3 molar in water. A suitable spacing between the glass plates is 500 μ. An electronic table calculator employing such a cell is shown in FIG. 11.

Figure 8:
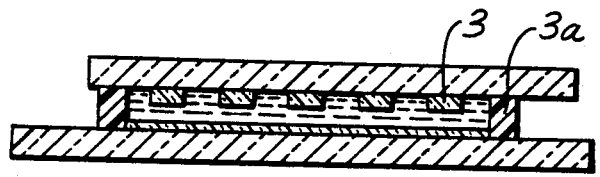
FIG. 8 is a view of the electrodes of FIG. 7 in a display cell.
Figure 9:
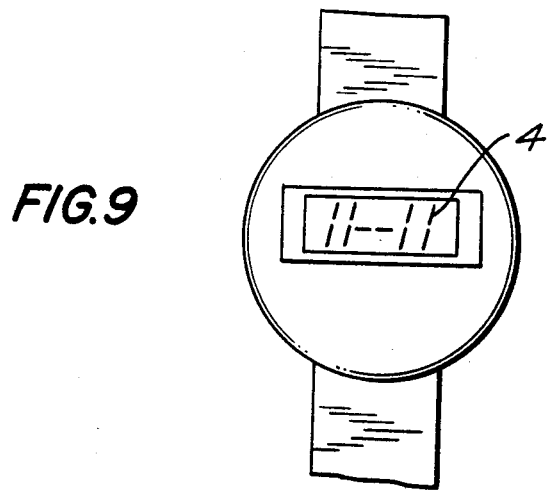
FIG. 9 is a watch incorporating electrodes with insulated leads and contact areas as shown in FIGS. 7 and 8.
Figure 12:
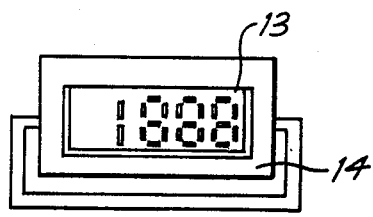

Another embodiment of the present invention is prepared by vacuum deposition of tin oxide on two glass substrates, the needed pattern being formed on one of the glass substrates by superimposition of a photo-resist and removal of the useless portions by means of an etching solution consisting of phosphoric acid, acetic acid and hydrochloric acid. A film of silicone resin is then placed on the electrode leads made in this way. The glass substrates are then assembled parallel to each other to form a cell such as is shown in FIG. 8. The cell is filled with one of the electrochromic solutions described. A digital volt meter using such a cell is shown in FIG. 12.

It will thus be seen that the objects set forth above, among those made apparent from the preceding description, are efficiently attained and, since certain changes may be made in the above article without departing from the spirit and scope of the invention it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. The electrochromic display cell, comprising a first transparent wall, at least one transparent conductive electrode on the inner surface thereof, a second wall opposed to and spaced apart from said first wall, a reflective metal selected from the group consisting of gold and silver on the interior surface of said second wall, an electrochromic material in solution between said opposing inner surfaces, said electrochromic material in solution being the sole electrochromic material in said cell, at least one contact region proximate the edge of said first wall, a transparent conductive lead connecting said electrode on said first wall with said contact region, and an insulating layer over at least a portion of said transparent conductive lead, said reflective metal having an area including at least that area immediately opposite said conductive electrode on said first wall, said electrode on said first wall and said reflective metal being connectable to an exterior source of voltage and said reflective metal being selected to be inert when rendered negative at the voltage necessary for erasing a display generated by making said transparent electrode negative.

2. The electrochromic display cell as defined in claim 1, wherein said insulating material is selected from the group consisting of $MgF_2$, $CaF_2$ and silicone resins.

3. An electrochromic diplay cell comprising a transparent first plate, at least one transparent conductive electrode on the inner surface thereof, an opposed second plate spaced apart from said first plate, a conductive electrode selected from the group consisting of gold and silver covering at least an area including that in registry with said electrode on said first plate, conductive leads making contact with each of said electrodes on said first and second plates, said leads being disposed for connecting said electrodes to an external source of voltage, an electrochromic material in solution between said opposed plates, said electrochromic material in solution being the sole electrochromic material in said cell, and an insulating material over at least a portion of each of said conductive leads.

4. The electrochromic display cell as defined in claim 3, wherein said insulating material is selected from the group consisting of $MgF_2$ and $CaF_2$ and silicone resins.

* * * * *